United States Patent
Girdhar et al.

(10) Patent No.: US 12,118,492 B2
(45) Date of Patent: Oct. 15, 2024

(54) METHODS AND APPARATUS FOR DATA-DRIVEN VENDOR RISK ASSESSMENT

(71) Applicant: Privva, Inc., Baltimore, MD (US)

(72) Inventors: Ishan Girdhar, Arlington, VA (US); John Lemp, Fredericksburg, VA (US); Sammy Elhag, San Diego, CA (US)

(73) Assignee: PRIVVA, INC., Baltimore, MD (US)

( * ) Notice: Subject to any disclaimer, the term of this patent is extended or adjusted under 35 U.S.C. 154(b) by 381 days.

(21) Appl. No.: 17/019,899

(22) Filed: Sep. 14, 2020

(65) Prior Publication Data

US 2021/0089978 A1    Mar. 25, 2021

Related U.S. Application Data

(60) Provisional application No. 62/903,696, filed on Sep. 20, 2019.

(51) Int. Cl.
| | | |
|---|---|---|
| *G06Q 10/06* | (2023.01) | |
| *G06Q 10/0635* | (2023.01) | |
| *G06Q 30/018* | (2023.01) | |
| *H04L 9/40* | (2022.01) | |

(52) U.S. Cl.
CPC ....... *G06Q 10/0635* (2013.01); *G06Q 30/018* (2013.01); *H04L 63/1433* (2013.01); *H04L 63/205* (2013.01)

(58) Field of Classification Search
CPC ................ G06Q 10/06; H04L 63/14
USPC ...................................... 705/7.28
See application file for complete search history.

(56) References Cited

U.S. PATENT DOCUMENTS

| | | | |
|---|---|---|---|
| 2003/0037063 A1* | 2/2003 | Schwartz | ............... G06Q 40/08 |
| 2008/0016563 A1 | 1/2008 | McConnell et al. | |
| 2009/0158302 A1 | 6/2009 | Nicodemus et al. | |
| 2009/0182593 A1 | 7/2009 | Whitmore | |
| 2013/0298192 A1 | 11/2013 | Kumar et al. | |

(Continued)

FOREIGN PATENT DOCUMENTS

WO    WO 2016/164403 A1    10/2016

OTHER PUBLICATIONS

International Search Report and Written Opinion mailed Dec. 15, 2020 in connection with International Application No. PCT/US2020/050646.

(Continued)

*Primary Examiner* — Nga B Nguyen
(74) *Attorney, Agent, or Firm* — Morris, Manning & Martin, LLP; Adam J. Thompson, Esq.

(57) ABSTRACT

The techniques described herein relate to methods, apparatus, and computer readable media configured to provide data-driven vendor risk assessment. In some aspects, a distributed computer system is provided that includes an interface component adapted to obtain security status information from at least two software application components, the at least two software application components being used by an organizational entity. The distributed computer system also includes a monitoring component adapted to receive the security status information from the at least two software application components and to determine a security status of the organizational entity based on the received security status information.

19 Claims, 15 Drawing Sheets

(56) References Cited

U.S. PATENT DOCUMENTS

| | | |
|---|---|---|
| 2014/0278730 A1 | 9/2014 | Muhart et al. |
| 2016/0306965 A1* | 10/2016 | Lyer ................... G06Q 10/0635 |
| 2017/0251013 A1* | 8/2017 | Kirti ................... H04L 63/1441 |
| 2018/0357422 A1 | 12/2018 | Telang et al. |
| 2019/0098037 A1* | 3/2019 | Shenoy, Jr. ......... H04L 63/1441 |
| 2020/0021620 A1* | 1/2020 | Purathepparambil ........................ H04L 63/102 |
| 2021/0084057 A1* | 3/2021 | Chhabra ............. H04L 63/1416 |

OTHER PUBLICATIONS

Umbach, A Data-Driven Approach to Vendor Risk Management. BitSight Technologies. Jan. 6, 2015; 5 pages.
Extended European Search Report dated Jul. 27, 2023 for European Application No. 20864421.1.

* cited by examiner

METHODS AND APPARATUS FOR DATA-DRIVEN VENDOR RISK ASSESSMENT

CROSS-REFERENCE TO RELATED APPLICATIONS

This application claims the benefit under 35 U.S.C. § 119(e) of U.S. Provisional Patent Application No. 62/903,696, entitled Methods and Apparatus for Data-Driven Vendor Risk Assessment, filed Sep. 20, 2019, which is incorporated by reference herein in its entirety.

TECHNICAL FIELD

The techniques described herein relate generally to data-driven vendor risk assessment, and in particular relate to a computing platform that automatically monitors third-party vendor application components used by an organizational entity to determine a security status for each of the third-party application components, the organizational entity, or both.

BACKGROUND OF INVENTION

Advances in third party security-based vendor components provide organizations (e.g., companies, law firms, financial firms, etc.) with a myriad of security options to meet security needs, including for application security, network security, organization security, and/or the like. However, with so many different vendors and applications available, it can be difficult, if not impossible, for an organization to adequately perform vendor risk assessment to ensure that each vendor application meets the organization's security objectives. In particular, it can be difficult for an organization to perform vendor risk assessment, including not only the individual vendor/application level, but also at a broader global level across the various vendors and applications used by a particular organization so that the organization can get an overall sense of the organization's risk assessment.

SUMMARY OF INVENTION

In accordance with the disclosed subject matter, apparatus, systems, and methods are provided for data-driven, real-time vendor risk assessment that continuously monitors data from an organization's security tools and other internal data sources against industry-standard security standards and objectives.

Some embodiments relate to a distributed computer system that includes an interface component adapted to obtain security status information from at least two software application components, the at least two software application components being used by an organizational entity, and a monitoring component adapted to receive the security status information from the at least two software application components and to determine a security status of the organizational entity based on the received security status information.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Figure 1:
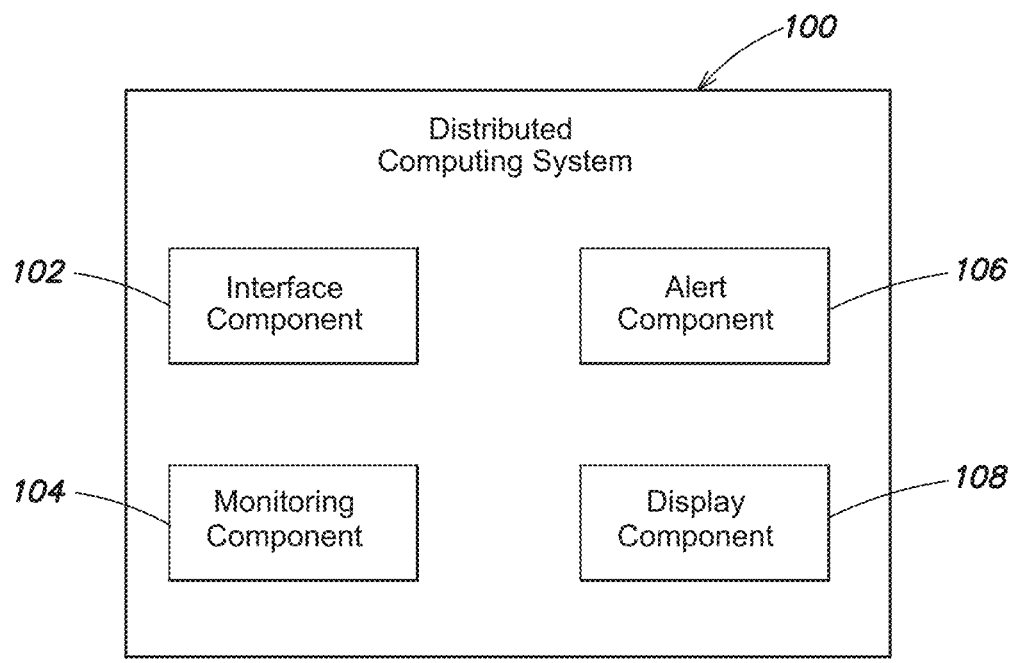
FIG. 1 is an exemplary distributed computing system for real-time integration and analysis of software application components (e.g., security tools), according to some embodiments.

The inventors have discovered and appreciated various deficiencies with vendor risk assessment techniques. In particular, current vendor risk assessment relies on the organizations to manually complete security questionnaires for each third party tool. Such manual questionnaires are prone to error, are not standardized (e.g., resulting in different security questionnaires and an inability to re-use and/or cross-reference security questionnaires), and can be submitted in different formats (e.g., through existing platforms, Microsoft Excel, email, etc., making it difficult to process the submitted data). Additionally, such manual questionnaires can be tedious and time consuming to complete, since organizations typically need to provide evidence of answers and/or supporting information. Further, such questionnaires need to be periodically recompleted, and since the questionnaires are manually completed each time, there is typically no historical data that allows comparison with previous responses, verification of responses, and/or the like.

The inventors have developed a computing platform that centralizes vendor risk assessment into a single, automated, and data-driven platform. The platform allows organizations to connect third-party vendor software application components that are used by the organization, including internal data sources of the organization, to the platform so that the platform can continuously monitor the applications and data sources in real-time. Each third-party vendor software application component can include a set of monitored data points. The platform can map the software applications and/or individual data points to defined risk objectives to automatically monitor the risk data on a regular basis. The end-result provided to the organizational entity is a single, unified dashboard that can show the organization's risk assessment at a global level across all monitored categories. Additionally, once configured, the organization does not need to re-configure the dashboard periodically (e.g., other than adding and/or removing tools as they change within the organization). The computing platform can therefore use a combination of custom APIs, data point mappings, defined sets of objective analysis criteria, weightings, and other organizational and data-driven features to automate real-time monitoring of risk data. The platform can analyze not only general data related to a particular vendor or software application, but also existing internal data within the organization. Therefore, the techniques described herein revolutionize third-party vendor assessment approaches from tedious, manual, subjective, and error-prone annual questionnaires to a real-time, data driven and continuous monitoring methodology that is customized to each organization.

In some embodiments, the techniques provide a dashboard that can provide each organizational entity with a single, unified summary and detailed analysis of their connected third-party vendor software application components. By centralizing each organizational entity's vendor information, the platform can provide aggregate statistics across all of the organization's vendors and data sources. The platform can also allow alerts and remediation requirements to be provided to organizational entities in real-time, and in a manner that seamlessly translates from real-time data sources to organizational entity assessments and alerts.

In some embodiments, the techniques provide vendor-specific and/or software application-specific dashboards, which can be viewed by both the organizational entity, as well as by the vendor. The vendor-specific information can be provided to vendors by leveraging the organizational-specific data from each organization to provide the vendor with information regarding the various deployments within the organizations supported by the platform. In some embodiments, the user interfaces can be designed to provide levels of abstraction where necessary, to preserve data confidentiality, etc.

The techniques can provide one or more of the following advantages. The techniques can allow organizational entities and third party vendors to better utilize top line objective data for security risk management. The techniques can reduce the manual, time-intensive work typically required by vendors and organizations for risk management. The techniques can improve transparency of risk information to both organizations and vendors, and can streamline communication of risk data both within an organization as well as for external vendors. By centralizing the information into a dashboard, risk data can be easily reviewed and monitored, and alerts and other critical information can be provided in real-time based on current, up-to-date information. The techniques can also allow remediation tasks to be identified and tracked on an organizational entity level.

As an illustrative example, an organization (e.g., a law firm, financial institution, or other corporation) typically uses tens to hundreds of third party vendor software tools. Many, if not all, of those vendor tools have access to the organization's data, the organization's network, and/or the organization's facilities. Using prior techniques, the organization needs to manually complete tens to hundreds of questionnaires for each tool, and typically needs to re-complete the questionnaires periodically throughout the year or on a yearly basis. Further, prior tools had no way to analyze data within the organization, such as data indicative of organization incidents, threats, numbers of protected computing devices, and/or the like, which can change in real-time. The techniques provided herein allow the organization to configure a central computing platform to access real-time data for each of the third-party software components, and to map the data from the third party components to various objectives so that the computing platform can monitor each third party component in real time. The platform can use the dashboard user interface to provide status and scores for the software applications, as well as for the organization as a whole.

While some examples discussed herein refer to accessing and monitoring software tools provided by third-party vendors, the use of the term "vendor" is for illustrative purposes only, and is not intended to be limiting. For example, the techniques can be used by an organization to monitor and/or assess other third parties (e.g., other organizations, suppliers, other partners to the organization, and/or the like). As another example, an organization can use the techniques to perform self-monitoring and/or self-assessment. Therefore, the techniques can be used for a variety of different applications and use cases, and the discussion of vendors herein is not intended to limit the applicability of the techniques described herein.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 is an exemplary distributed computing system 100 for real-time integration and analysis of software application components (e.g., security tools), according to some embodiments. The distributed computing system 100 includes an interface component 102, a monitoring component 104, an alert component 106, and a display component 108. While the distributed computing system 100 is shown using a single box, this is for illustrative purposes only and is not intended to be limiting. The distributed computing system 100 can include a plurality of computing devices, cloud computing devices, and/or the like, which can be configured to implement some and/or all of the components of the distribute computing system 100. Additionally, the various components of the distributed computing system 100 can be configured to communicate with each other to exchange data, distribute functionality across computing platforms, parallelize computing tasks, and/or the like.

The interface component 102 is adapted to obtain security status information from various software application components, such as various security tools provided by security tool vendors. As described further herein, a vendor can configure the distributed computing system 100 to interface with software application components provided by the vendor (e.g., via API, push notification, data logs, and/or the like). An organizational entity can configure which software application components are being used by the organization in order to set up real-time analysis of the software application components for the organizational entity, as discussed further herein, including specific, internal data to the organization.

The monitoring component 104 is adapted to receive the security status information from the various software application components. Each software application component can include a set of data points. The monitoring component uses a set of mappings to analyze software applications and/or individual data points against sets of pre-defined objectives to determine risk information for each organization. The monitoring component 104 can determine a security status of the vendors, software applications, and/or organizational entity based on the received security status information, as discussed further herein.

The alert component 106 is configured to alert an entity responsive to a change in security status information. For example, as described further in conjunction with FIGS. 4 and 10C, the computing platform can periodically review and update security status information over time as the real-time data changes. The computing platform can keep track of new issues, completed issues, as well as communications between the organization and the entity.

The display component 108 is configured to display, to a user (e.g., to a member of an organizational entity, of a vendor, and/or the like), various data determined by the distributed computing system 100. For example, the display component 108 can be configured to generate various dashboards and associated user interfaces to display software application component-level information, vendor-level information, and organizational-level information, as discussed further herein, including in conjunction with FIGS. 6-11.

Figure 2:
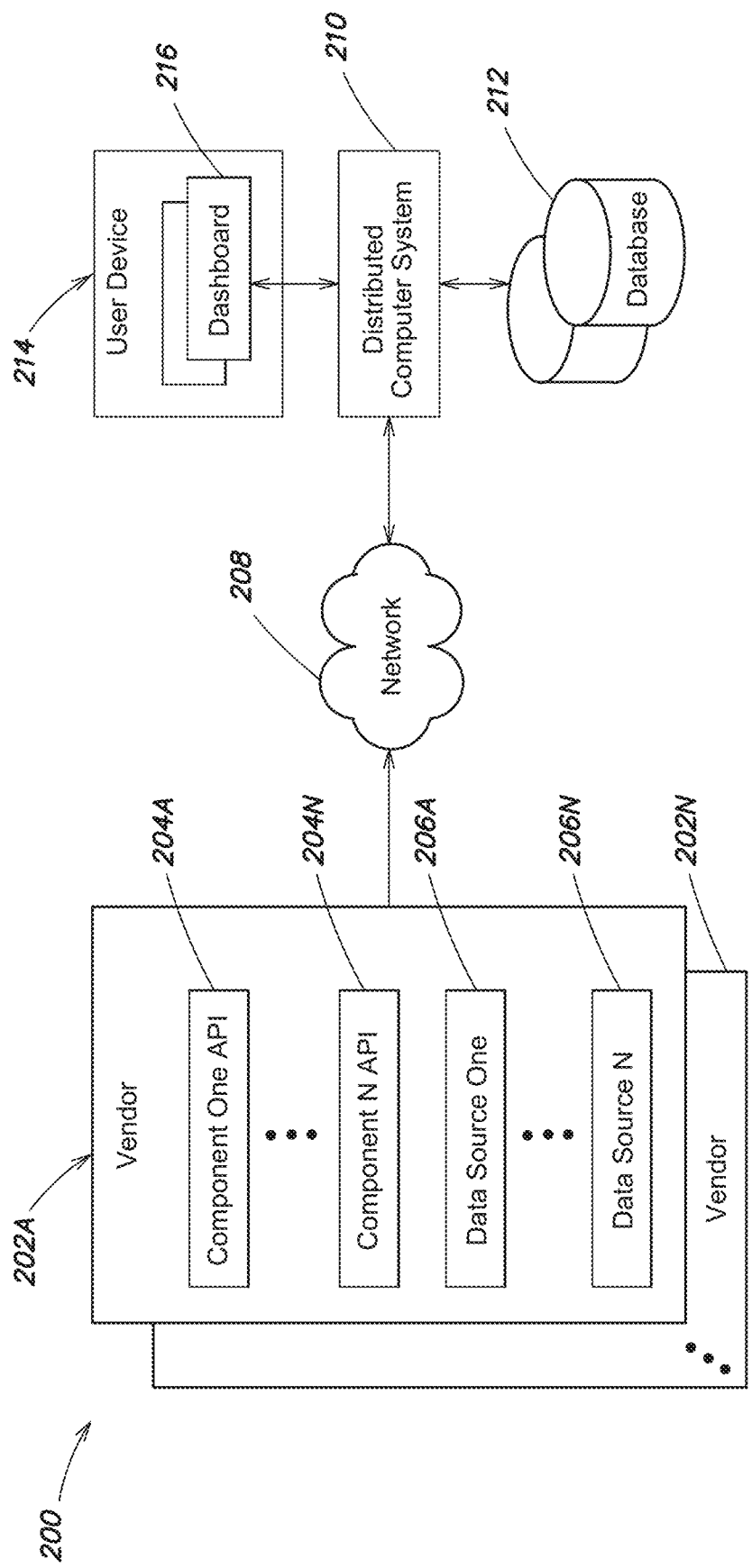
FIG. 2 is a system diagram showing a system for providing real-time integration and analysis of security status information, according to some embodiments.

FIG. 2 is a system diagram showing a system 200 for providing real-time integration and analysis of security status information, according to some embodiments. A plurality of vendors 202A through 202N (collectively referred to herein as vendor 202) connect to the distributed computer system 210 via network 208. The distributed computer system 210 can be, for example, the distributed computer system 100 discussed in conjunction with FIG. 1. The network 208 can be any type of communication network, such as a local area network (LAN), a wide area network (WAN), the Internet, a cellular network, and/or some combination thereof.

Each vendor 202 can configure the software application components that it provides to interface the components with the distributed computer system 210. As shown in this example, in some embodiments, the vendor 202 can interface a set of software application components, shown in this example as software application component one 204A through software application component N 204N (collectively referred to as software application component 204) through an API to the distributed computer system 210. In some embodiments, the vendor 202 can interface software application component data sources, shown as software application data source 206A one through software application data source N 206N (collectively referred to as data source 206) to the distributed computer system 210, such as through a data log, push notifications, and/or the like.

The distributed computer system 210 can include and/or be in communication with a database 212. The distributed computer system 210 can use to store the security status information obtained for each software application component. The computer system 210 can also store a set of objective requirements that are used to analyze security status information from the software application components to automate the vendor risk assessment process, as described further herein. The computer system 210 can also store a set of mappings between software applications and data points to objectives. In some embodiments, the database 212 can be, for example, a data lake, a SQL database, a distributed database, and/or any other type of database sufficient for storing the security status information.

The distribute computer system 210 is in communication with one or more user devices 214, such as smartphones, tablets, laptops, desktops, and/or other computing devices with a display capable of displaying the dashboard 216 generated by the distributed computer system 210 (e.g., generated by the display component 108 in FIG. 1). The users of the user devices 214 can include, for example, vendors, organizations, and/or the like.

Figure 3:
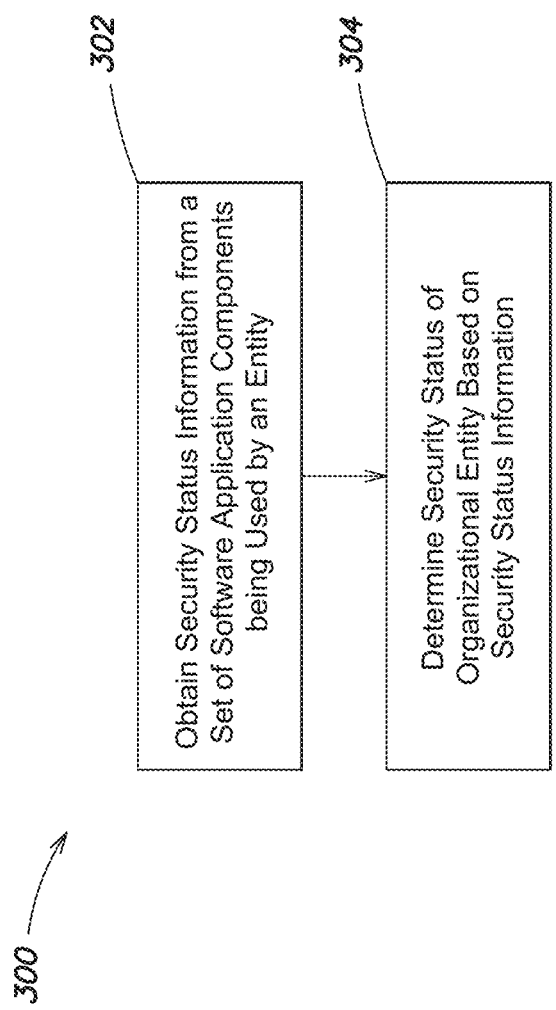
FIG. 3 is a flow chart showing an exemplary high level computerized method for determining the security status of an organizational entity based on real-time security status information, according to some embodiments.
Figure 4:
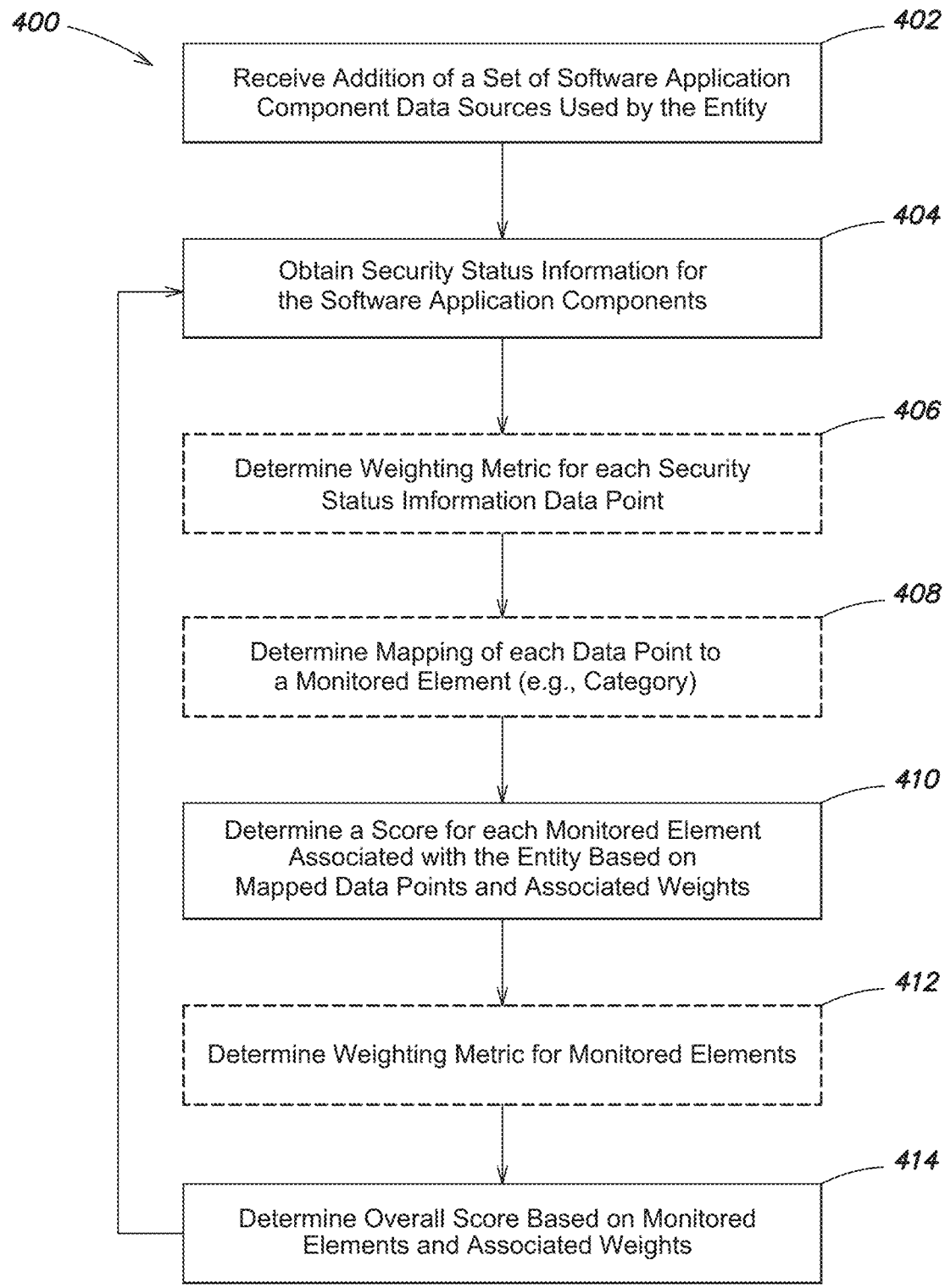
FIG. 4 is a flow chart of an exemplary detailed computerized method for obtaining security status information and determining a security score for an entity, according to some embodiments.

FIG. 3 is a flow chart showing an exemplary high level computerized method 300 for determining the security status of an organizational entity based on real-time security status information, according to some embodiments. The method 300 can be executed by, for example, the distributed computing system 100 shown in FIG. 1. At step 302, the computing system obtains security status information from a set of software application components that are connected by an entity. At step 304, the computing system determines security status information for the organizational entity based on the security status information. These steps 302 and 304 are discussed in further detail in conjunction with FIG. 4. FIG. 4 is a flow chart of an exemplary detailed computerized method 400 for obtaining security status information and determining a security score for an entity, according to some embodiments. The method 400 can be executed by, for example, the distributed computing system 100 shown in FIG. 1. At step 402, the computing system receives information allowing a set of software application component data sources (e.g., APIs, data logs, push notifications, etc.) to be connected to the computing system so that the computing system can obtain security status information for the software application components.

As an example, Symantec provides an Endpoint Protection tool whose API can provide the number of insecure devices of a total number of monitored devices. An organization may have a security objective that requires that all employee endpoints are reporting security status information at least nightly, which could be verified via a regular API request. As another example, AlertLogic provides a Vulnerability Scanning and Intrusion Detection tool. The API from these tools could be used to verify conformance to the frequency or timing of a scan (e.g. nightly or after a code push) or a certain threshold of priority or volume of intrusions (e.g. low criticality and under five alerts). As another, Github's API could be called to determine that code scanning has found no security flaws. Data logs from an organization's infrastructure could be reviewed regularly to ensure only approved IP addresses or users were accessing the infrastructure or application. Collectively, these set of tools could provide an overall status of compliance to a set of industry standard security objectives or organization specific objectives.

As another example, the API for Amazon Web Services (or other cloud/infrastructure providers) can be used to verify that specific features are enabled, such as whether Amazon Guard Duty is enabled and is monitoring the AWS account for signs of compromise. The AWS API can also be used to ensure specific configurations around security and/or best practices are employed, such as whether encryption settings are correct, audit logging is enabled, minimum SSL/TLS protocols/ciphers are applied on load balancers and if IAM password policies and multifactor authentication is employed.

In some embodiments, when an API does not provide the metric or data point required in direct form, then access to data and/or events in log form may be analyzed, aggregated and calculated by the system to determine whether a certain threshold of events in time or quantity has occurred in order to indicate a change in status. An example would be when a certain number of specific types or classes of malware detection events are found within the Endpoint Protection event logs in a 24 hour time period.

In some embodiments, some classes of data points may be more event driven and therefore may be pushed instead of polled via the API. For example, an organization's continuous integration process may perform various analysis of an application's source code during the development and deployment process. When the CI/CD process fails to meet specific criteria such as static code analysis policies or known vulnerabilities are found within the code, dependencies, or components, a failure event can be sent via a push mechanism such an http webhook call, call to another API, email, etc.

Figure 7:
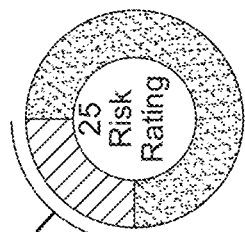
FIG. 7 is an exemplary user interface of a connection window for a vendor to connect a software application component through an API, according to some embodiments.

Organizations can send requests to vendors to provide information necessary for the computing platform to connect to vendor software application components. Vendors can choose to connect to the platform using different techniques. For example, FIG. 7 is an exemplary user interface 700 of a connection window for a vendor to connect a software application component through an API, according to some embodiments. As shown in the user interface 700, the objective can be selected from a list of various objectives in a drop-down list, which in this example is selected to be "code analysis." The user interface 700 also provides a drop-down list of different security vendors for selection. The user interface 700 further allows the security vendor to enter information that allows the computing platform to connect to an API of the software application component, including an API key, an API secret, and a username and password for the vendor. Once a vendor provides a software tool API key, the platform can periodically connect to the software tool's API to pull relevant data. The platform can interpret the data based on the risk objective being measured (e.g. have there been any new critical events? was a vulnerability scan performed in the last X hours? Etc.) to display a status on the dashboard as well as calculate any change to the risk score for that vendor.

Another example of a technique that a vendor can use to connect a software application component is to implement a software development kit (SDK) to connect to an API provided by the computing platform. In this scenario, the vendor can download and/or be provided with a set of code that the vendor can run on their environment. This code can be described as a 'connector' that would retrieve the appropriate data via the vendor security tool's API or data logs. The code may also interpret the data and generate summary data that can be sent to the platform API for display within the cloud-based dashboard. Alternatively, the vendor may be provided with an API that accepts certain statuses (e.g. compliant, non-compliant, no connection, not applicable, etc.) and the vendor may build their own code to deliver these statuses for a given objective on some periodic basis (e.g. hourly, daily, weekly). The platform may apply a weighting to the risk score based on the reliability of the data. For example, data that the platform retrieves directly from an API can be weighted as most reliable, data from connector code can also be weighted as fairly reliable, and data sent to the Privva API from custom-code might be weighted as acceptable but less reliable.

At step 404, the computing system obtains security status information for the software application components that are associated with an organizational entity. The security status information can include a set of data points for each associated software application component. For example, sample data points for a network security application can include the number of incidents, the threat-rating of the incidents (e.g., low, medium, high, etc.), the class of the incident (e.g., application-level attach, etc.), and/or the like. As another example, encryption data points for an online storage application can include default encryption settings for storage buckets, the encryption type, the file-level encryption settings, and/or the like. As another example, an identity management application could provide information on password complexity, two factor authentication status, and required password reset frequency. As an example of organizational security, a background check application could provide information on the latest background check status or verification that all incoming employees have undergone a background check. The computing platform can store the obtained security status information in a database (e.g., the database 212 shown in FIG. 2).

In some embodiments, the security status information can be stored historically over time. The historical information can allow the system to compare security status information for different time periods. In some embodiments, the security status information can be updated in real time when new information is available and/or when changes occur. In some embodiments, the software tools and/or the computing system can be configured to perform periodic check-ins, if data is not received, to confirm that each software application is properly reporting data.

At step 406, the computing system optionally determines a weighting metric for each security status information data point. In some embodiments, the computing device may not determine the weighting metrics for some or all of the data points. For example, the weighting metrics can be pre-configured, pre-determined, and/or the like. Thus, in such embodiments, the computing system may access data indicative of some or all of the weighting metrics and/or be configured to use certain weighting metrics. The weighting metrics can be used, as explained further below, to weight the system's analysis of each data point to an associated objective, in order to provide risk data for each software application.

Weighting of the inputs to an overall security score may be used to achieve a representative calculation. As an example, organizations or industries may have differing viewpoints on the most important security objectives. The tools utilized to meet these objectives may accomplish subtasks with different priority or criticality levels, or a tool aligned to a given objective may have varying data granularity or accuracy which would imply a greater or lesser weight should be applied in an overall score. Weighting of the inputs can also be used to balance cases when multiple sources that contribute to a single source or category exists. As another example, weighting of metrics can also be changed over time as certain classes of risk change (e.g., due to internal or external factors such as known exploits occurring in the wild or changes in industry knowledge or understanding). As a further example, a manual attestation to an objective might have lesser weight than a data point received from a tool or data log.

At step 408, the computing system optionally determines mapping information for each data point to a monitored element (e.g., to a monitored security category, category objective, etc.). Generally, the computing system obtains information from various sources, such as from APIs, push notifications, and/or the like. The computing system can use the mappings to determine how to focus on the data points that are relevant to analyzing a particular objective. For example, as part of an overall security or risk score, different industries or organizations may view conducting Background Checks or running Email Scanning as weighted less than others such as Data Encryption or Infrastructure Security. As another example, an organization with only a marketing web site might have a lower weight placed on whether or not they conduct Code Analysis than an organization that has a heavily used custom web application. Specific sources contributing to an objective could have weights applied in order to take into account that certain vulnerabilities are more critical if they occur on a certain group of users or for specific parts of their infrastructure than others, for example if a vulnerability is found within a system that contains sensitive information or within a group of users that have access to sensitive information. In some embodiments, since the system can use different APIs for different tools, the mappings can align data across APIs. The mapping can identify a relationship between data elements associated with security status information of some and/or all software application components to an associated monitored element. The computing system can store the mapping information in, for example, storage (e.g., memory) internal to the computing system and/or in an external database, such as the database 212 in FIG. 2.

Figure 11:
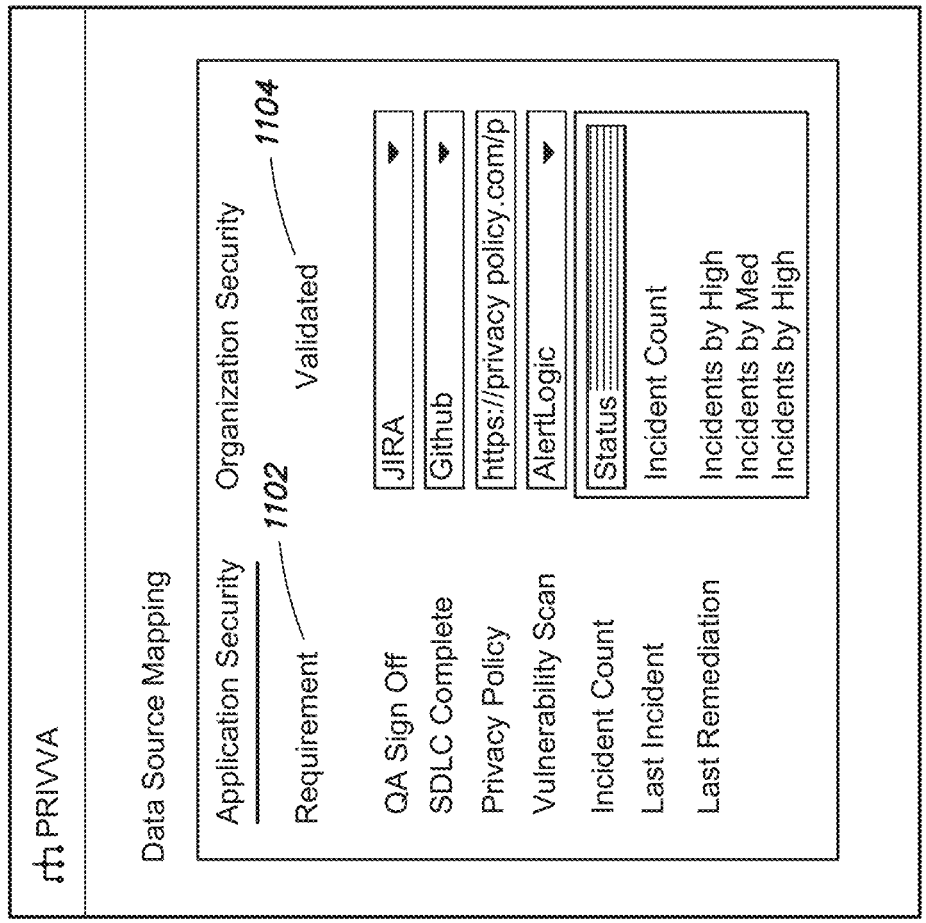
FIG. 11 is an exemplary user interface for configuring a data source mapping, according to some embodiments.

In some embodiments, the organizational entity can create customized mapping information to align software applications and/or data points to objective requirements of the organization. In some embodiments, the organizational entity can be provided with one or more user interfaces that allow the organizational entity to easily align applications and data points to requirements. FIG. 11 is an exemplary user interface 1100 for configuring a data source mapping, according to some embodiments. As shown by the interface 1100, the user interfaces can allow the organizational entity to configure a data mapping for each monitored category, with this example being for application security. The user interface 1100 provides a set of requirements 1102 and a set of validated data sources. As an example, the vendor selected for the vulnerability scan can provide either an incident count or incidents by type, including high, medium and low. The user interface 1100 may indicate a status of the aligned tool. As an example, this status could represent compliance or varying degrees of compliance to an objective. If AlertLogic was aligned to an objective "to complete Vulnerability Scans nightly with no critical vulnerabilities" and the API or data log showed that a scan was completed within the last 24 hours and no critical vulnerabilities were found, the system would show compliance for that day. This data would be stored over time and could be presented or trended historically as well. As another example, if Github was aligned to an objective "to complete dependency scanning with every code release," the system would check periodically for new code versions and whether scanning occurred to indicate a status. Organizational controls for mitigating risk may require that changes to an application are tested by a group other than the developers. A company's process may therefore require that the Quality Assurance team has completed testing and signed off on the changes, in this example via Jira.

Figure 6:
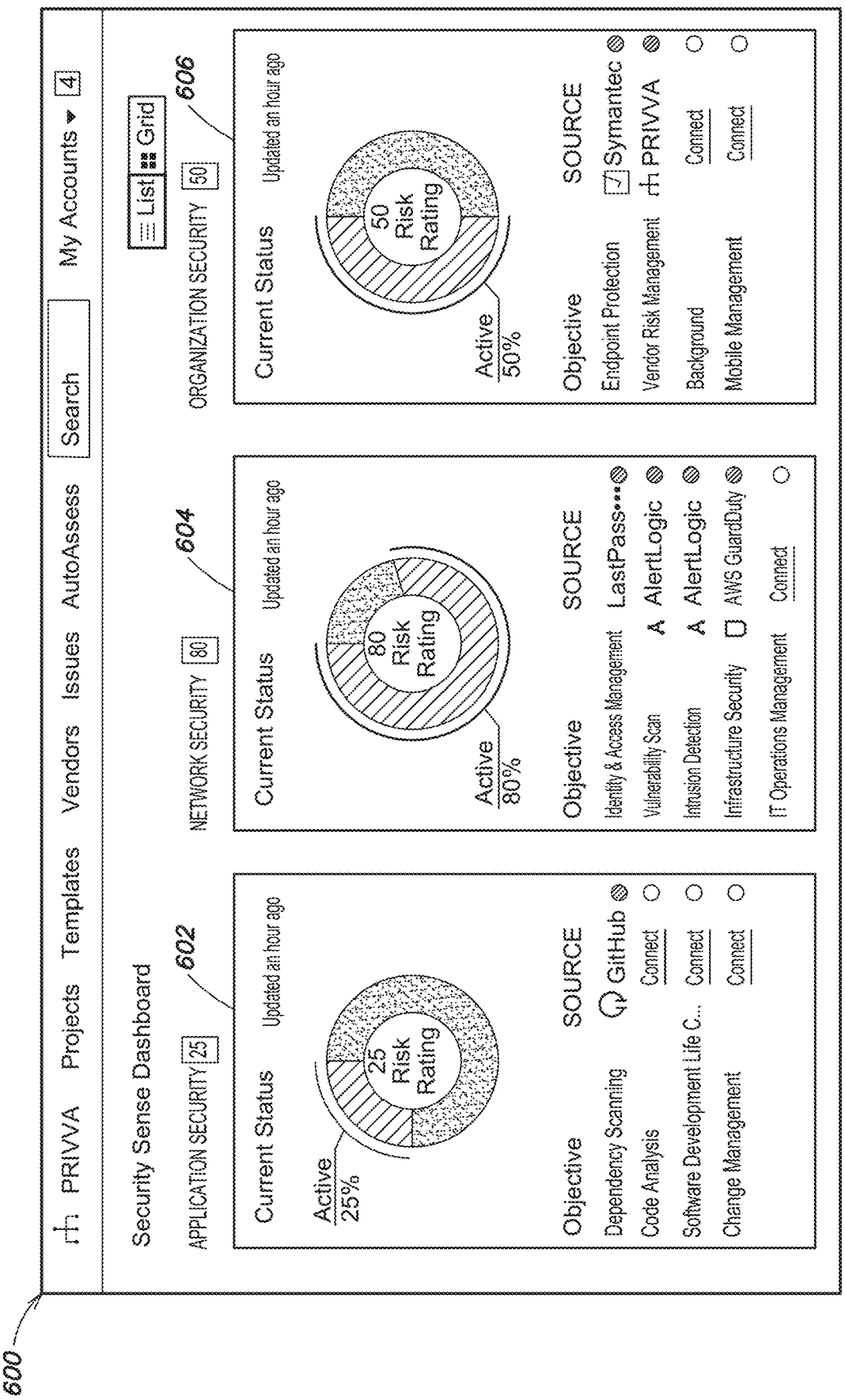
FIG. 6 is an exemplary user interface of a dashboard showing a set of monitored objectives for an organizational entity, according to some embodiments.

FIG. 6 is an exemplary user interface 600 of a dashboard showing a set of monitored objectives for an organizational entity, according to some embodiments. The interface 600 shows three categories, namely Application Security, Network Security, and Organizational Security, each in a respective sub-window 602, 604 and 606, respectively. Each category includes a set of monitored software components. The Application Security category, as shown in the sub-window 602, includes the objectives Dependency Screening, Code Analysis, Software Development Life Cycle, Change Management, and Data Encryption. In this example, the organizational entity has only connected a third-party vendor component for the Dependency Scanning objective. Therefore, the interface 600 includes a pie chart showing a status of only 25% active (only ¼ objectives are connected). As described herein, such a status is just an illustrative example of a risk score, and it should be appreciated that various calculations and metrics can be used without departing from the spirit of the techniques described herein. The Network Security category, as shown in sub-window 604, includes the objectives Identity & Access Management, Vulnerability Scan, Intrusion Detection, Infrastructure Security, and IT Operations Management. In this example, the organizational entity has connected software application components for all of the objectives besides IT Operations Management. Therefore, the interface 600 shows a status of 80% active (⅘ objectives are connected). The Organization Security category, as shown in sub-window 606, includes the objectives Endpoint Protection, Vendor Risk Management, Background, and Mobile Management. In this example, the organizational entity has connected software application components for the Endpoint Protection and Vendor Risk Management objectives. Therefore, the interface 600 shows a status of 50% active (²⁄₄ objectives are connected).

Similar to the weighting metrics discussed in conjunction with step 406, step 408 is optional. In some embodiments the computing device may not determine the mapping information (or related information, such as parameters as discussed above) for some or all of the data points. The computing system may instead access data indicative of some or all of the mappings and/or be configured to use certain mappings.

At step 410, the computing system determines a score for each monitored element based on the mapped data points of the security status information and associated weights for the data points. The scoring of each monitored element, as well as the scoring for the organization as a whole, is discussed further in conjunction with steps 414 and FIG. 5.

At step 412, the computing system determines a weighting metric for each monitored element. Similar to the weighting metrics discussed in conjunction with step 406, in some embodiments the computing device may not determine the weighting metrics for the monitored elements. A given tool may report multiple relevant data points. For example, Symantec's Endpoint Protection product can report the number of insecure devices as well as the number of critical events. In this case, the Symantec contribution to an overall score may include an aggregation of the impact of the number of insecure devices and critical events. Since critical events may represent data breaches while insecure devices represent potential risks, critical events may be weighted more highly. Additionally or alternatively, critical events could have a weight applied based on another organizational data point. A proportional weight based on the number of overall devices might be applied. The computing system may instead access data indicative of some or all of the weighting metrics for the monitored elements and/or be configured to use certain weighting metrics for the monitored elements.

Figure 5:
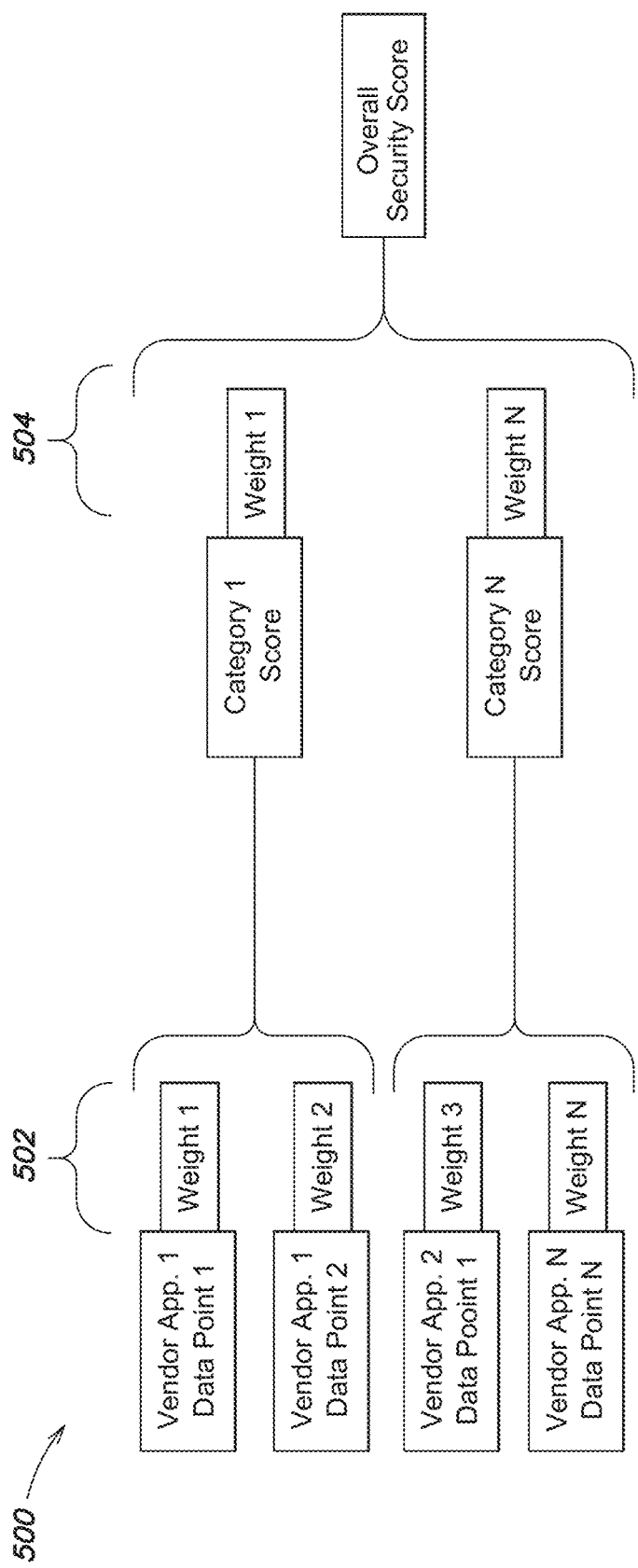
FIG. 5 is a diagram showing the use of weights to compute an overall security score for an entity, according to some embodiments

At step 414, the computing system determines an overall score for the entity based on the monitored elements. Referring to steps 406-414, FIG. 5 is a diagram 500 showing the use of weights to compute an overall security score for an entity, according to some embodiments. As discussed in conjunction with step 406, a first set of weightings 502, shown as weights one, two, three, through N, are determined and used to weight the various data points of the security status information. As discussed in conjunction with step 410, for each vendor software application component, the computing system uses the associated data points and weights to determine a score for the vendor application. As shown in FIG. 5, the computing system weighs the vendor application one data points one and two using weights one and two, respectively, to compute the category 1 score. Similarly, the computing system weighs vendor application two data points one through N using weights one through weights N, respectively, to compute the category N score. As discussed in conjunction with step 412, the computing system accesses a second set of weighting metrics for the monitored elements 504. At step 414, the computing system weighs each of the categories one through N using the associated weight one through weight N, respectively, to determine the overall security score. In some embodiments, the overall security score can indicate a risk level for an organization that is using the associated software components, which are often provided a number of vendors.

Equation 1 is an exemplary weighted scoring, according to some embodiments:

$$(App_1 W_1(W_1 \times High + W_2 \times Med + W_3 \times Low + W_4 \times RemTime) + App_2 W_2(W_5 \times High + W_6 \times Med + W_7 \times Low + W_8 \times RemTime) + \ldots + App_N W_N (W_N \times High + W_{N+1} \times Med + W_{N+2} \times Low + W_{N+3} RemTime)) / (Org \times OrgSize + OrgW \times SystemsMonitored)$$ (Equation 1)

Where:
$App_1 W_1, App_2 W_2, \ldots App_N W_N$ are weights for each of the N third party vendor software application components used by the organizational entity;
$W_1, W_2, \ldots W_{N+5}$ are the various weights that can be used to weight the data points of each software application component;
High, Medium, and Low are the number of high, medium, and low priority events for each software application component;
RemTime is the remediation time for current issues of the software application component;
OrgW is the weight for the organizational entity;
OrgSize is the number of systems of the organization; and
SystemsMonitored is the number of systems of the organization being monitored by the computing platform.

As an example, a vendor may align Symantec Endpoint Protection to an endpoint protection objective and Privva to a vendor risk management objective. As a simplified example where these are the only two inputs to an overall score of 100, suppose the Endpoint Protection objective is weighted at 30% and the Vendor Risk Management objective is weighted at 70%. These weightings might be manually or automatically configured due to industry or organization preferences, the quality of the aligned tools data, a weight derived from breach risk data, and/or other configurations. As an example, data suggests that third parties are responsible for a majority of data breaches.

In this example, Symantec Endpoint Protection returns two data points (the number of insecure devices and number of critical events) and they are equally weighted at a maximum contribution of 15 points each to the total Endpoint Protection objective of 30 points. If the security objective rule dictates that no more than 10% of devices may be insecure, assuming the returned number of insecure devices is below this threshold, a total score of 15 could be applied. If no critical events were found, 15 total points could be applied. In this example, a total of 30 points is received. As an alternative example, if the security objective rule dictates that each insecure device should apply an equal penalty, 10% insecure devices would reduce the total score of 15 by 1.5 points to 13.5 for this objective summing to a total score for Endpoint Protection of 28.5.

Similarly, for the Vendor Risk Management objective, the Privva API may return three data points such as the percentage of assessed vendors, the average assessment score, and the average number of open remediation tickets. In this example, the percentage of assessed vendors can be weighted at two times the other components. This means that the percentage of assessed vendors can receive a total of 35 points, while the average assessment score and average number of open remediation tickets data point can receive a total of 17.5 points each. If 80% is the percentage of assessed vendors the score for this component is 28. If 90% is the average assessment score, the score for this component is 15.75. If the average number of remediation tickets is below a threshold, the score for that component may be the total of 17.5. If the Vendor Risk Management tool subscores are added together, the result is 61.25 of the total 70 points possible.

Lastly, combining the Endpoint Protection score of 28.5 in the final example above with the 61.25 score derived from the Vendor Risk Management tools, the result is a total security score of 89.75 of a total 100 possible. This single score reflects the weighted risk of the combined objectives and the aligned security data points and can be viewed over time to see high level trends in risk.

Referring to steps 406 and 412, in some embodiments the weights can remain fixed, such as for each software application, for each organization, and/or for each vendor. In some embodiments, the weights can change and/or be variable for different organizations, different scenarios, and/or the like.

Referring further to step 414, once complete, the method 400 proceeds back to step 404. As described herein, the computing system can be configured such that it performs real-time collection of any new or modified security status information. In particular, the computing system can be configured to re-perform steps 404-414 upon receipt of new data (or when new data is available) and/or periodically, in order to provide a real-time, updated security score.

In some embodiments, the computing system can be configured to provide a security status of a third party vendor. For example, security status information across a plurality of organizations that use application(s) provided by the vendor can be used to determine an overall security status for software application(s) provided by the vendor. In some embodiments, security status information across a plurality of software applications provided by the vendor, including for a single organization or across a plurality of organizations, can be used to provide a security status for the software applications provided by the vendor. In some embodiments, the computing system can determine a risk level associated with using individual software applications and/or with using the vendor in general.

The various security status information and calculated scores and metrics can be provided to the organization and/or to the vendors using a centralized dashboard. FIGS. 6-11 are examples of user interfaces that provide a centralized dashboard of security status information. The computing system (e.g., via the display component 108 discussed in FIG. 1) can be configured to generate displays of various dashboard elements, including for monitored categories of software application components being used by the organizational entity. As described herein, the monitored categories can include application components, network components, and organizational components.

Figure 8:
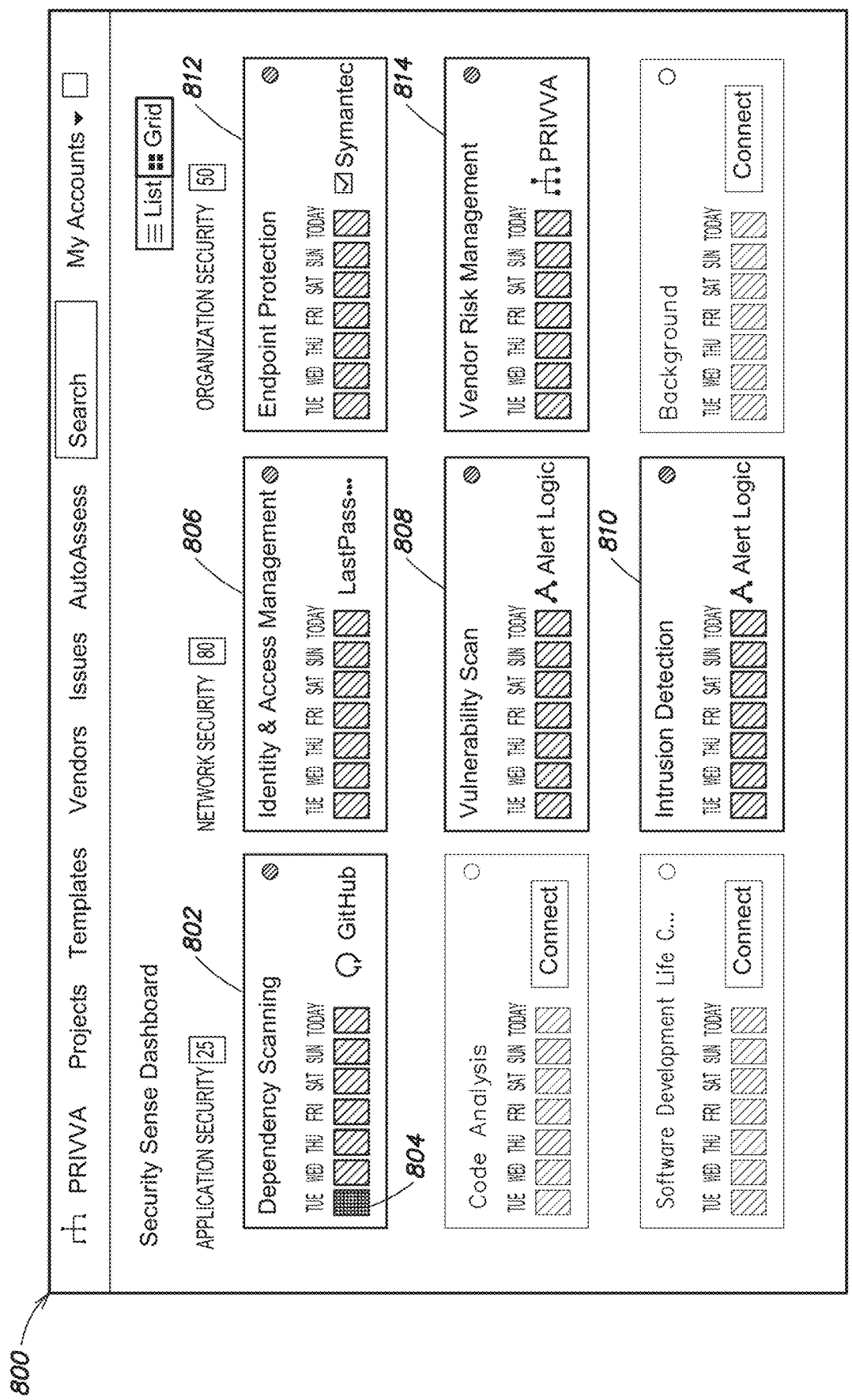
FIG. 8 is an exemplary user interface of a dashboard showing historical information for a set of monitored objectives, according to some embodiments.

As described above, FIG. 6 is shows exemplary user interface 600 of a dashboard showing a set of monitored objectives for an organizational entity, and FIG. 7 shows an exemplary user interface 700 of a connection window for a vendor to connect a software application component through an API, according to some embodiments. FIG. 8 is an exemplary user interface of a dashboard 800 showing historical information for a set of monitored objectives, according to some embodiments. The dashboard 800 includes a set of grid views for various software application components for each of the monitored categories Application Security, Network Security, and Organization Security. For Application Security, the organization connected a software application for Dependency Scanning, which shows in the dashboard component 802 a grid view that can display a color-coded status for each day of the preceding week (i.e., Tue, Wed, Thu, Fri, Sat, Sun, and Today) to indicate the general security score for the software application for each of those days. For example, if the software component had a good security score, the associated box 804 can be colored green, whereas the box can be colored orange for an average security score, and colored red for a poor security score. For Network Security, the organization connected software applications for Identity & Access Management, Vulnerability Scan, and Intrusion Detection, which include corresponding grid views 806, 808 and 810. For Organization Security, the organization connected software applications for Endpoint Protection and Vendor Risk Management, which include corresponding grid views 812 and 814.

Figure 9:
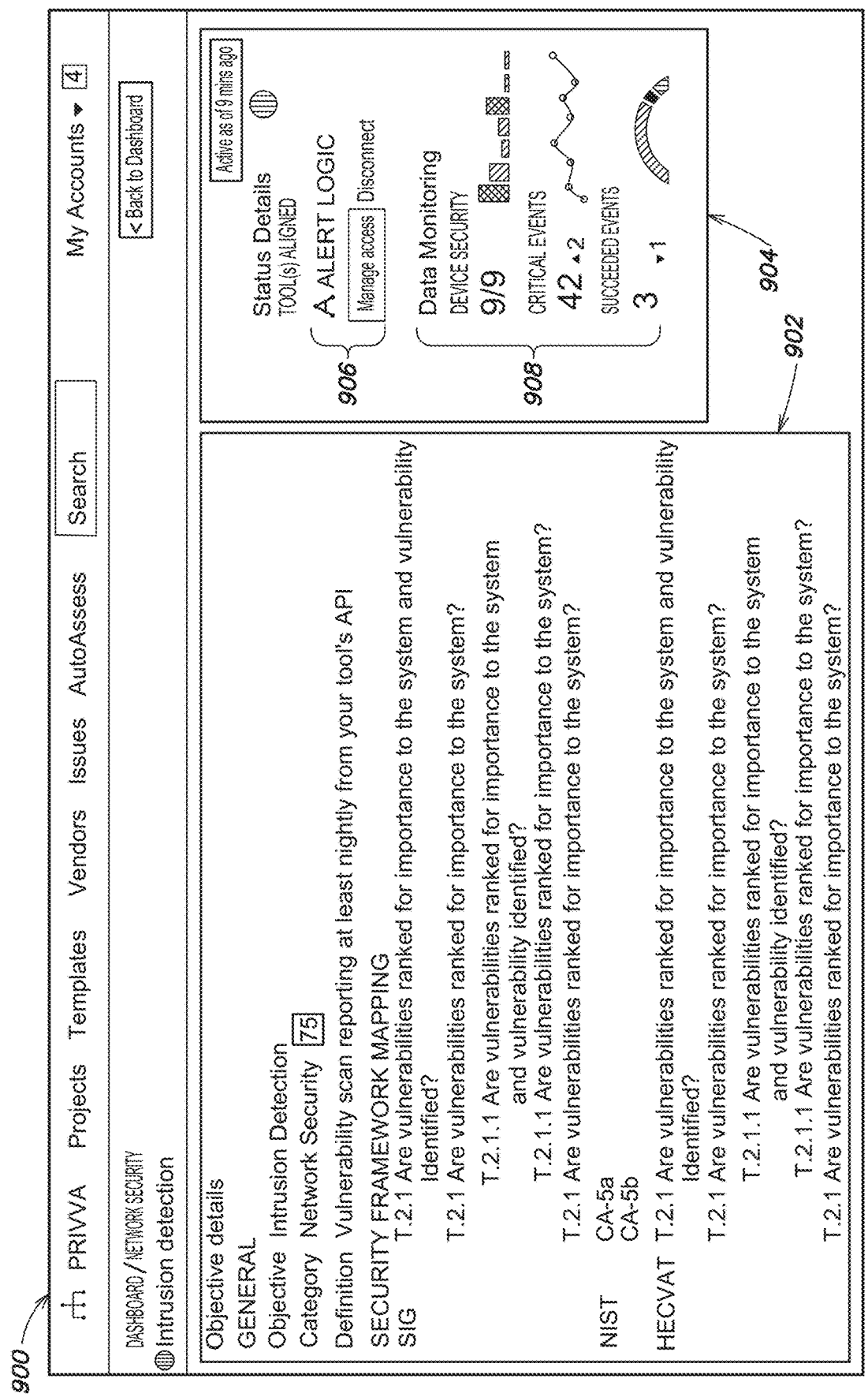
FIG. 9 is an exemplary user interface showing security objective details for Intrusion Detection for the Network Security Category, according to some embodiments.

The dashboard can allow organizations to drill-down into details on each monitored component. For example, from the main dashboard shown in either FIG. 6 (a list view dashboard) or FIG. 8 (a grid view dashboard), a user can click on a particular monitored objective to bring up detailed information for the particular objective. For example, FIG. 9 is an exemplary user interface 900 showing security objective details for Intrusion Detection for the Network Security Category, according to some embodiments. The sub-window 902 shows the objective details for Intrusion Detection, which includes general information as well as security framework mapping. Several sets of security questions have been defined by industry organizations, security professional groups, or regulatory compliance. Some examples of these questionnaires include the Standardized Information Gathering (SiG) questionnaire, the National Institute of Standards and Technology (NIST) questionnaire, or the Higher Education Cloud Vendor Assessment Tool (HECVAT). Each of these questionnaires typically provides an objective or question with a reference code such as T.2.1 or CA-5.a. These questionnaires can range in size from 100 s to 1000 s of questions. In another iteration, each of these questions could be aligned to one or more data points from a tool. The data points retrieved could indicate a status or response such as compliance for each question. For example, for a question about whether a web app utilizes regular vulnerability scanning, an aligned tool could indicate that scanning has occurred nightly. The sub-window 904 shows status details for Intrusion Detection, including the tool connected for the objective at 906, as well as data monitoring information 908 based on data received from the relevant API source(s), including that nine out of nine devices are secure, there are forty-two critical events outstanding (e.g., as of the last data pull), and three succeeded events outstanding (e.g., also as of the last data pull). The sub-window 904 also includes a notification that the connected Intrusion Detection software application running within the organization last provided an update nine minutes ago (e.g., the computing system may be configured to check for data every hour, and the last check happened nine minutes ago).

The information shown for each monitored objective can be specific to the particular objective. For example, while the user interface 900 in FIG. 9 shows objective details and status details that are specific to Intrusion Detection, a different monitored objective can provide different information. As another example, for Endpoint Detection, the provided information may indicate what number of devices in the organization network are insecure (e.g., "X" number of devices are insecure out of "Y" total devices), a number of events that need to be addressed, and/or the like. As a further example, the objective details can be customized for each objective, organization, and/or the like. For example, the objectives can map data points to information in traditional manual questionnaires, data security standards, standards provided by standard setting bodies (e.g., the International Standards Organization), and/or the like. Therefore, each objective can be related to a number of different objectives in an industry or framework.

Figure 10A:
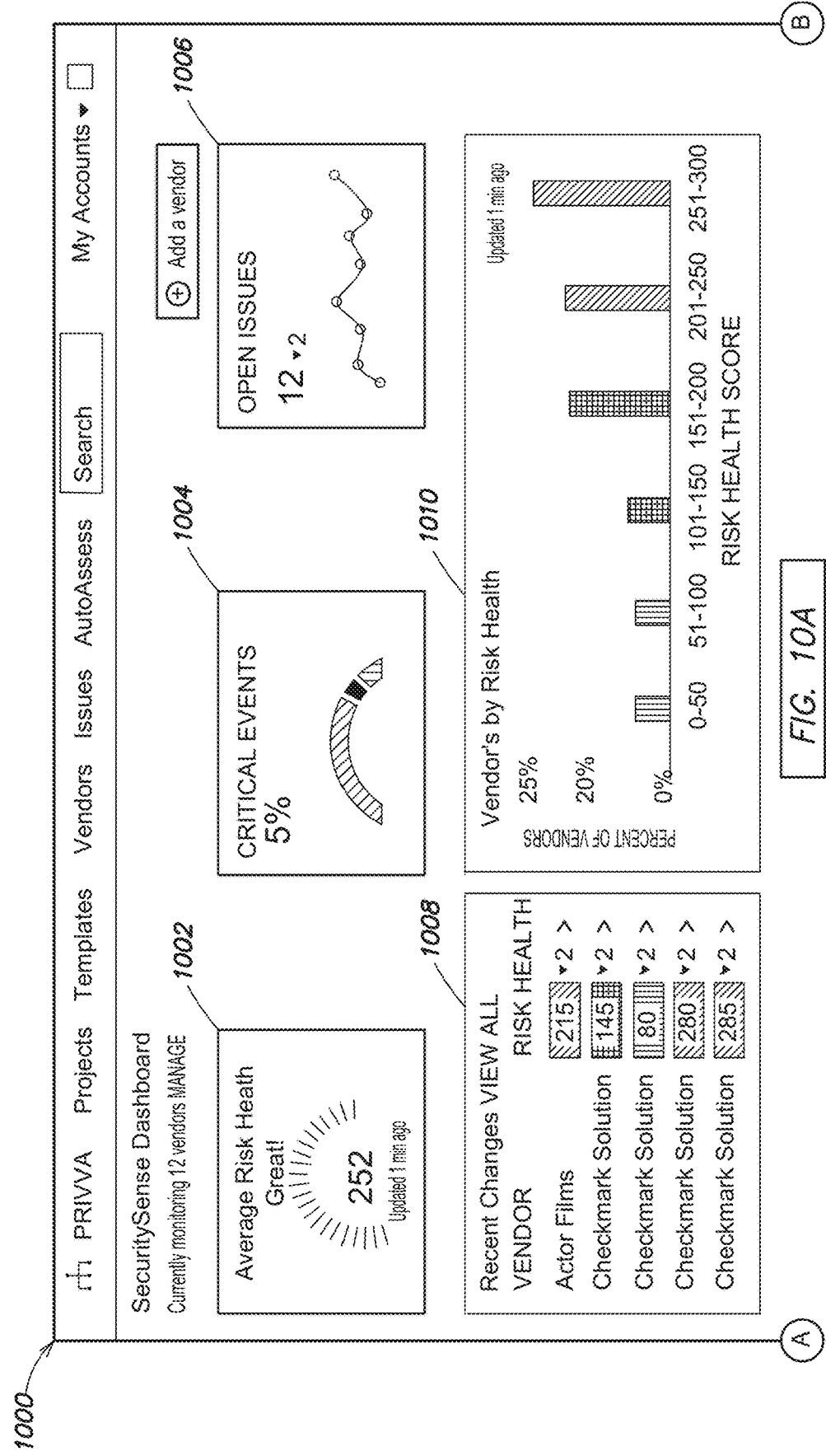
FIGS. 10A-10C are exemplary user interfaces showing a dashboard of aggregated vendor information for an organizational entity, according to some embodiments.
Figure 10B:
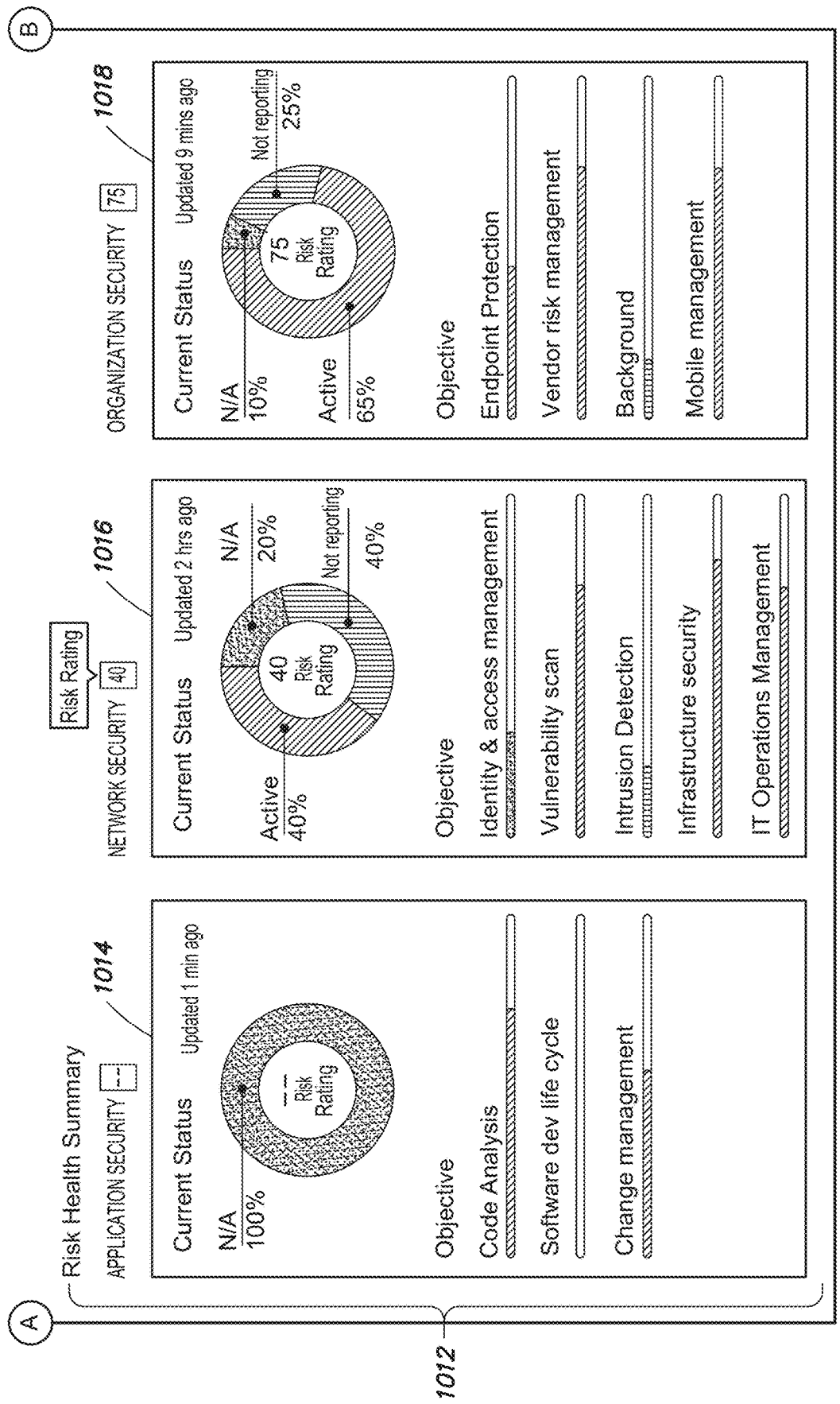
Figure 10C:
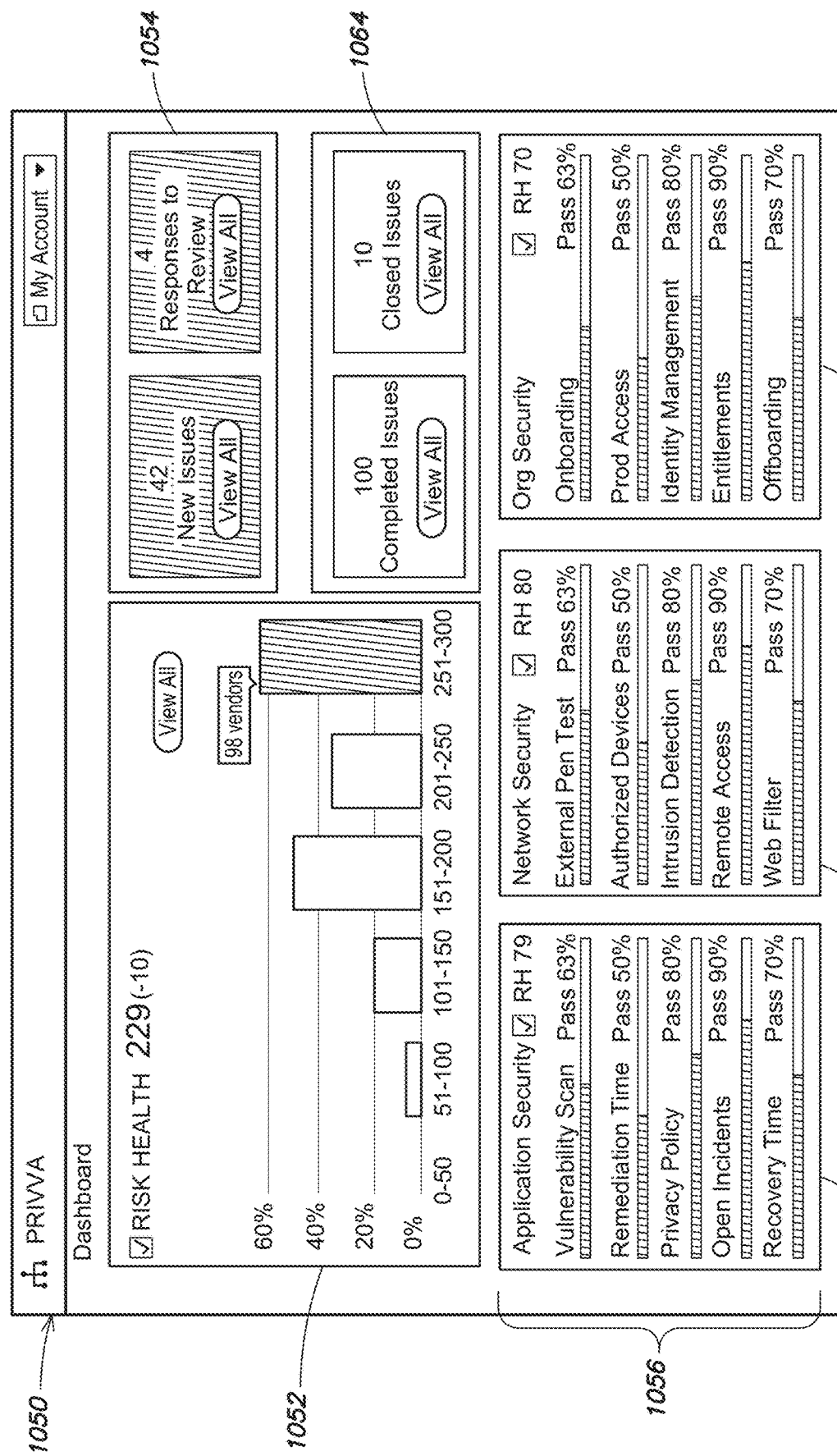

FIGS. 10A-10C are exemplary dashboard user interfaces. FIGS. 10A-10B are a first exemplary user interface 1000 showing a dashboard of aggregated vendor information for an organizational entity, according to some embodiments. Generally, the goal of the dashboard of the aggregator vendor information is to provide the user with a unified dashboard that can provide the user with information for all of the user's various third-party vendors and third-party software components. The interface 1000 includes a dashboard component 1002 that shows the organizational entity's average risk health of 252. As described herein, risk health is an example of a scoring identifier, and can include in some embodiments a risk rating (e.g., as discussed in conjunction with FIG. 10D), a risk health (e.g., as discussed in conjunction with FIGS. 10A-10C), and/or any other type of scoring identifier. In this example, the health can range from zero to 300, and therefore a score of 252 is indicated as a great risk health score. In this example, the score of 252 is the average of all vendor security scores. All vendors are not shown on this dashboard, but 1010 shows that most vendors are in the 201-250 and 251-300 score ranges. In this example, each vendor is scored out of 100 on three categories of objectives, Application Security, Network Security, and Organization Security. Additional categories or alternative weighting of each category could be used to reflect varying security standards or methodologies. The interface 1000 includes a dashboard component 1004 that shows the number of critical events to be 5%. The dashboard 1000 includes a dashboard component 1006 that shows the number of open issues is 12 issues.

The dashboard 1000 includes a dashboard component 1008 that shows recent changes to the risk health of various vendor software components. The dashboard 1000 includes a dashboard component 1010 that shows a graph of vendors by risk health. In particular, the x-axis of the graph shows buckets of risk health scores that include scores of 0-50, 51-100, 101-150, 151-200, 201-250 and 251-300. The y-axis shows the percentage of the number of vendors for each bucket.

The dashboard also includes a section 1012 with dashboard components 1014, 1016 and 1018 for the Application Security, Network Security, and Organization Security categories, respectively. Each dashboard component 1014, 1016 and 1018 includes a pie chart showing the average statuses across all vendors that are being monitored. The area marked as "active" represents the vendor average for active tools in this category, the area marked as "not reporting" shows the average not reporting, and the area marked as "N/A" shows the average that have been marked as not applicable. Each dashboard component 1014, 1016 and 1018 also includes a linear graph indicating the individual software application scores for each objective.

FIG. 10C is a second exemplary user interface 1050 showing a dashboard of aggregated vendor information for an organizational entity, according to some embodiments. Similar to FIGS. 10A-10B, the interface 1050 includes a dashboard component 1052 that shows the risk health of the organizational entity. Also similar to FIGS. 10A-10B, the dashboard also includes a section 1056 with dashboard components 1058, 1060 and 1062 for the Application Security, Network Security, and Organization Security categories, respectively. The user interface 1050 includes a dashboard component 1054 that shows both new issues (e.g., 42, in this example) and responses to review (e.g., 4, in this example). Additionally, the user interface 1050 includes a dashboard component 1064 that shows the number of completed issues (e.g., 100, in this example) and the number of closed issues (e.g., 10, in this example). As described herein, the computing system can automatically create issues and integrate vendor communications for remediation, which can be provided in the dashboard through components like those shown as 1054 and 1064.

Figure 10D:
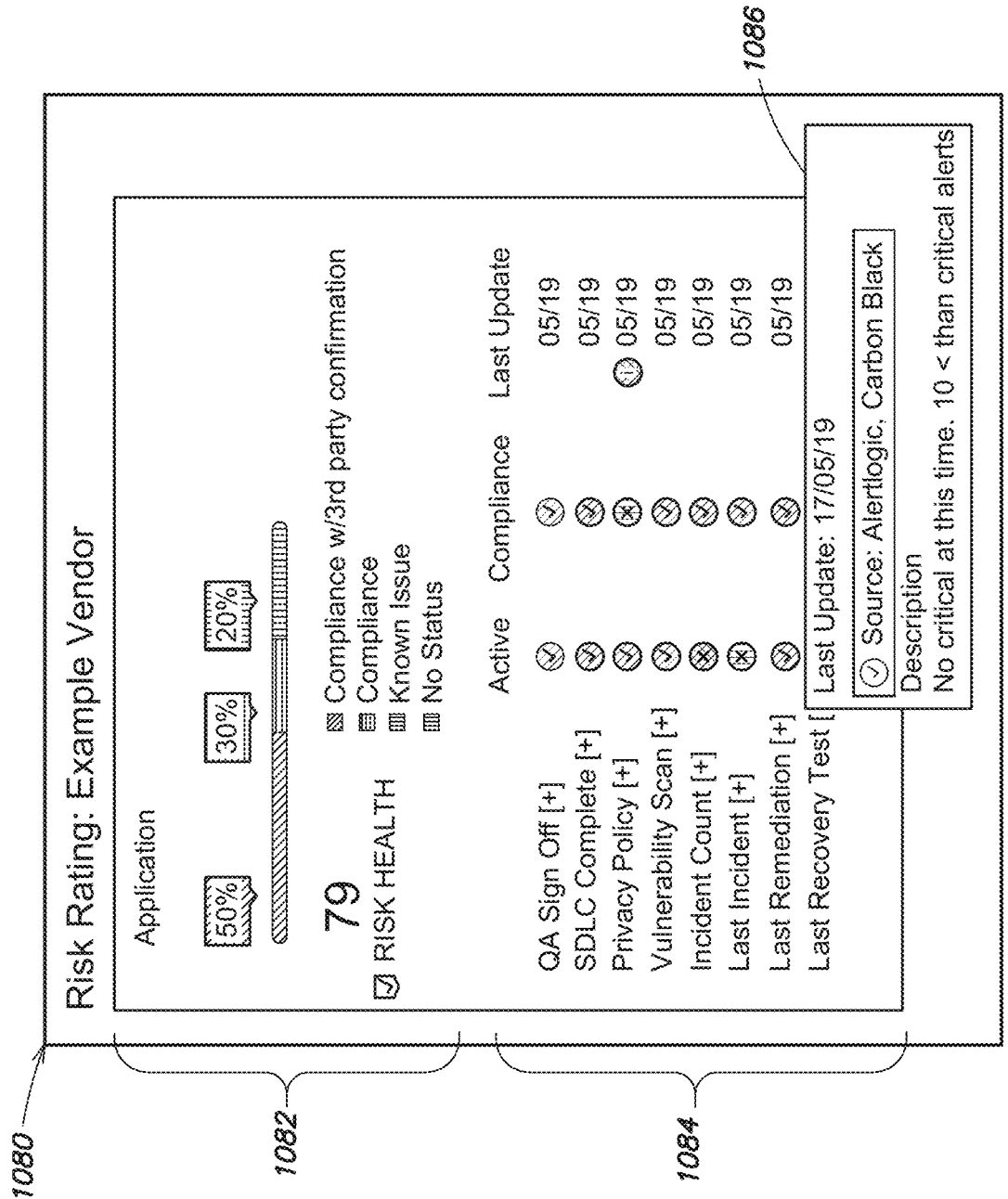
FIG. 10D is an exemplary user interface showing a detailed risk rating view of vendor information for an organizational entity, according to some embodiments.

FIG. 10D is an exemplary user interface 1080 showing a detailed risk rating view of vendor information for an organizational entity, according to some embodiments. The user interface 1080 provides a first component 1082 that breaks down the vendor risk health score of 79. In particular, 50% of the vendor information is complaint and has a third party confirmation, 30% is compliant (but without third party confirmation), and 20% has either a known issue or has no status. The user interface 1080 also includes a second component 1084 that shows each objective, whether it is active, whether there is compliance, and the date of the last update. The user can hover over, or click, a checkmark to be provided with details of the last update, as shown with pop-up 1086.

In some embodiments, the computing system can be configured to genericize the data. For example, the techniques can include an anonymization layer that anonymizes a relationship between a particular organization and the vendors from which the computing system is obtaining data from for the organization. For example, since the dashboard can be provided to both the organization as well as the vendors, when providing a dashboard to a vendor it may be desired and/or necessary to abstract out which organization the underlying data is associated with.

Figure 12:
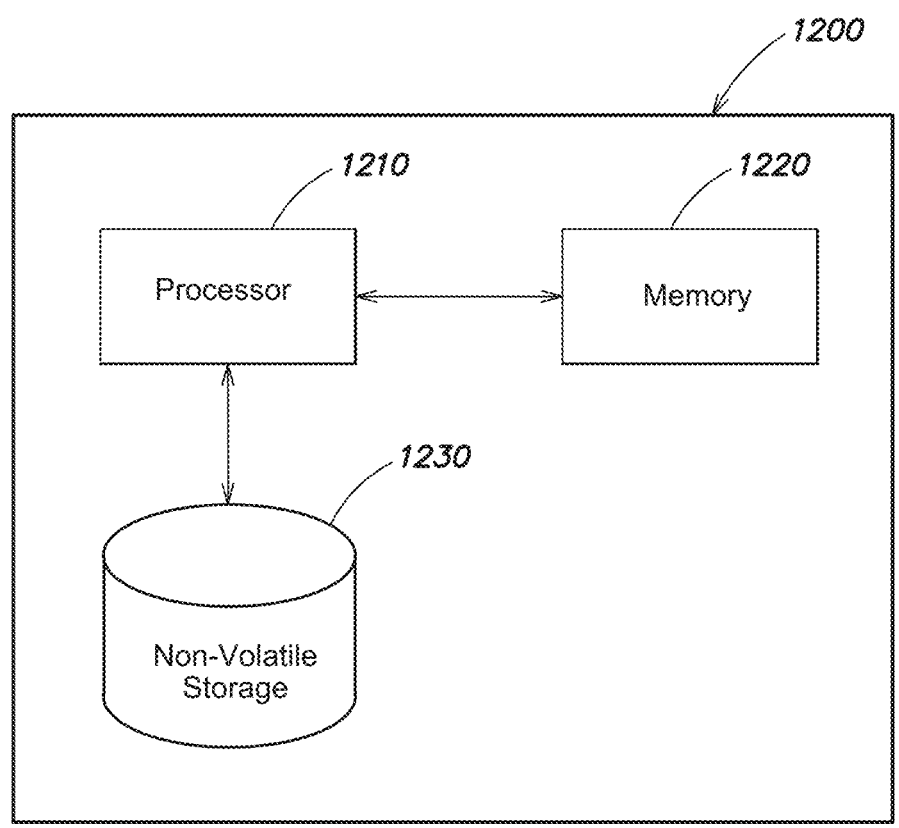
FIG. 12 shows an illustrative implementation of a computer system that may be used to perform any of the aspects of the techniques and embodiments disclosed herein.

An illustrative implementation of a computer system 1200 that may be used to perform any of the aspects of the techniques and embodiments disclosed herein is shown in FIG. 12. The computer system 1200 may include one or more processors 1210 and one or more non-transitory computer-readable storage media (e.g., memory 1220 and one or more non-volatile storage media 1230). The processor 1210 may control writing data to and reading data from the memory 1220 and the non-volatile storage device 1230 in any suitable manner, as the aspects of the invention described herein are not limited in this respect. To perform functionality and/or techniques described herein, the processor 1210 may execute one or more instructions stored in one or more computer-readable storage media (e.g., the memory 1220, storage media, etc.), which may serve as non-transitory computer-readable storage media storing instructions for execution by the processor 1210.

In connection with techniques described herein, code used to implement the techniques described herein for real-time, data driven risk assessment may be stored on one or more computer-readable storage media of computer system 1200. Processor 1210 may execute any such code to provide any techniques for managing devices as described herein. Any other software, programs or instructions described herein may also be stored and executed by computer system 1200. It will be appreciated that computer code may be applied to any aspects of methods and techniques described herein. For example, computer code may be applied to interact with an operating system to determine aspects of risk assessment as described herein through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects:

What is claimed is:

1. A computer system comprising one or more processors in communication with a computer-readable storage media storing instructions that, when executed by the one or more processors, cause the one or more processors to:
    generate a display for a graphical user interface comprising a plurality of monitored elements of an organizational entity, wherein the plurality of monitored elements correspond to predefined or user-specified security objectives;
    accept user input from the user interacting with the graphical user interface, the input assigning at least two software application components to each of the plurality of monitored elements of the organizational entity, wherein each of the at least two software application components performs a different operation;
    obtain security status information from the at least two software application components, the at least two software application components being used by an organizational entity, wherein, for each of the at least two software application components, the security status includes data points associated with operation of the software application component;
    map the data points of the security status information, for each of the at least two software application components, to relevant one or more of the plurality of monitored elements of the organizational entity based on stored mapping information;
    determine, for each of the plurality of monitored elements, a score based on the mapping of the data points to the plurality of monitored elements;
    determine a security status of the organizational entity by determining a weighted measure based on the score and first weighting information associated with each of the plurality of monitored elements;
    transmit, to the graphical user interface for display:
        the score for each of the plurality of monitored elements; and
        the security status; and
    generate and transmit, to the graphical user interface for display, an alert upon determining a change in a value of the security status of the organizational entity.

2. The computer system according to claim 1, wherein:
    the security status information comprises a security metric; and determining the security status comprises interpreting the security metric based on a predetermined formula for the organizational entity.

3. The computer system according to claim 1, further comprising a display configured to display, to a user, the obtained security status information.

4. The computer system according to claim 1, wherein the security status information from the at least two software application components is used to determine a security score that indicates the security status of the organizational entity.

5. The computer system according to claim 4, further comprising updating the security score in real time responsive to real-time collection of the security status information from at least two software application components.

6. The computer system according to claim 4, wherein the security score is determined using respective weighting of the at least two software application components.

7. The computer system according to claim 1, wherein the monitoring component is adapted to determine a security status of at least one of the at least two software application components based on the obtained security status information.

8. The computer system according to claim 7, wherein the at least one of the at least two software applications is provided by a vendor outside of the organizational entity and wherein the monitoring component is adapted to determine a security status of the vendor.

9. The computer system according to claim 7, wherein the monitoring component is adapted to determine a security score that indicates a risk level associated with using the at least one of the at least two software applications provided by the vendor.

10. The computer system according to claim 7, wherein the monitoring component is adapted to determine an aggregated security score that indicates a risk level associated with using a plurality of software components provided by a plurality of vendors.

11. The computer system according to claim 1, wherein the security status information is obtained from at least one of the group comprising:
   an API;
   a data log; and
   a data push.

12. The computer system according to claim 1, wherein the instructions, when executed by the one or more processors, cause the one or more processors to generate, within a user display, a dashboard display element comprising a plurality of monitored categories of software application components being used by the organizational entity.

13. The computer system according to claim 12, wherein the plurality of monitored categories of software application components comprises:
   application components;
   network components; and
   organizational components.

14. The computer system according to claim 1, further comprising a mapping that identifies a relationship between a data element associated with security status information of at least one of the at least two software application components to a monitored element.

15. The computer system according to claim 14, further comprising a memory adapted to store the mapping as mapping information.

16. The computer system according to claim 15, wherein the mapping information includes, for a vendor that provides one or more software components, a set of mapping elements that relate to a risk of use of the one or more provided software components by the organizational entity.

17. The computer system according to claim 15, wherein the memory is adapted to store parameter values of one or more monitored elements.

18. The computer system according to claim 17, wherein the memory is adapted to store combination logic, the combination logic being used by the monitoring component to determine a security status responsive to the stored parameter values.

19. A computerized method comprising:
   generating a display for a graphical user interface comprising a plurality of monitored elements of an organizational entity, wherein the plurality of monitored elements correspond to predefined or user-specified security objectives;
   accepting user input from the user interacting with the graphical user interface, the input assigning at least two software application components to each of the plurality of monitored elements of the organizational entity, wherein each of the at least two software application components performs a different operation;
   obtaining security status information from the at least two software application components, the at least two software application components being used by an organizational entity, wherein, for each of the at least two software application components, the security status includes data points associated with operation of the software application component;
   mapping the data points of the security status information, for each of the at least two software application components, to relevant one or more of the plurality of monitored elements of the organizational entity based on stored mapping information;
   determining, for each of the plurality of monitored elements, a score based on the mapping of the data points to the plurality of monitored elements;
   determining a security status of the organizational entity by determining a weighted measure based on the score and first weighting information associated with each of the plurality of monitored elements;
   transmitting, to the graphical user interface for display:
      the score for each of the plurality of monitored elements; and
      the security status; and
   generating and transmitting, to the graphical user interface for display, an alert upon determining a change in a value of the security status of the organizational entity.

* * * * *